United States Patent [19]

Umphenour et al.

[11] 3,804,194

[45] Apr. 16, 1974

[54] METHOD AND SEISMIC PNEUMATIC ENERGY PULSE GENERATORS FOR INCREASING ENERGY OUTPUT

[75] Inventors: Charles F. Umphenour; Reynaldo Calderon, both of Houston; John R. Rogers, Stafford, all of Tex.

[73] Assignee: Texaco Inc., New York, N.Y.

[22] Filed: June 29, 1972

[21] Appl. No.: 267,318

[52] U.S. Cl. .............................................. 181/.5 H
[51] Int. Cl. .................................................... G01v
[58] Field of Search............... 181/.5 H, .5 A, .5 EM; 102/25; 124/11, 13 A, 13 R

[56] References Cited
UNITED STATES PATENTS

| | | | |
|---|---|---|---|
| 3,276,534 | 10/1966 | Ewing et al. | 102/25 |
| 3,416,621 | 12/1968 | Balashkand | 181/.5 H |
| 3,525,416 | 8/1970 | Mott Smith | 181/.5 H |

*Primary Examiner*—Benjamin A. Borchelt
*Assistant Examiner*—J. V. Doramus
*Attorney, Agent, or Firm*—T. H. Whaley; C. G. Ries

[57] ABSTRACT

At least one method for increasing the energy output of a seismic pneumatic energy generator for generating a seismic primary pulse with attenuated secondary pulses and three articles for practicing or carrying out the method are disclosed. One seismic pneumatic energy generator for practicing the method comprises two similar, tandem, compressed air chambers having radial exhaust ports and two piston valves, one valve forming the front end of the first chamber and the other valve forming both the rear end of the first chamber and the front end of the second chamber so that the second valve is responsive to the depressurizing of the first chamber for opening the second exhaust port for releasing the energy from the second chamber for forming a seismic pneumatic energy generator of increased energy output, increased total volume of the compressed air chambers, and increased total exhaust port area without requiring change in the shape of the exhaust ports, without changing the pulse signature, nor the bubble ratio.

Modifications for practicing the method include seismic pneumatic energy generators having three or more similar, tandem, compressed air chambers with ports and valves for each.

18 Claims, 3 Drawing Figures

METHOD AND SEISMIC PNEUMATIC ENERGY PULSE GENERATORS FOR INCREASING ENERGY OUTPUT

BACKGROUND OF THE INVENTION

Broadly the present invention relates to seismic exploration and to a method and three improved pneumatic marine seismic energy pulse generators for carrying out the method and for the introduction of seismic energy into water in a conventional shot hole filled with water, marshy areas, or offshore from a floating vessel for supplying compressed air and having a geophysical crew thereon for exploring earth layers and formations underlying land or bodies of water as oceans, seas, lakes, rivers, or the like. More particularly this invention pertains to a method for increasing the energy output of a seismic pneumatic energy generator for generating a seismic primary pulse with attenuated secondary pulses, and three seismic pneumatic energy generators having increased energy output, increased total volume of the compressed air chambers, and increased total exhaust port area without requiring change in the shape of the exhaust ports, and without changing the pulse signature nor the bubble ratio.

While the method and apparatuses of the invention are applicable for many purposes as will be set forth further below, they are illustratively disclosed and described as applied to water or mud filled shot holes and to underwater sound instrumentation such as oceanographic equipment and systems that are employed in seismic exploration of the world's crust under and adjacent to bodies of water.

Since water is such a good sound conductor, it is unnecessary to generate sound waves right on or in the ocean floor; they can be produced in the water near the surface. The pressure waves travel down through the water to the ocean floor and are reflected as in the usual echo-sounding techniques. However these waves also penetrate into the ocean floor and are reflected from the sub-strata. These acoustical waves also propagate horizontally through one or more geological strata and may be recorded at a distance from the source, thus providing useful refraction data on the stratum or strata involved. The same is true when making geological surveys from the sudden release of a volume of high pressure air into the surrounding earth, marsh, or water of a shot hole.

Although explosives for marine seismic work can put large amounts of energy into the water and obtain great depth of penetration, they do have drawbacks; they are dangerous to handle and use, and in some areas such as congested harbors, they cannot be used at all. Also, each "shot" is very expensive and can run into many thousands of dollars per survey. Explosives tend generally to concentrate substantial amounts of their energy output into higher frequency components which may not be desirable for many purposes; whereas, the sound impulse generation method and apparatuses for the present invention can be adjusted over an amplitude range and can be modified to provide the desired spectrum distribution of sound frequencies for the purpose at hand.

The present invention is illustratively described as embodied in a device capable of emitting a large amount of acoustical energy into water in the form of a clear, repeatable pulse, the frequency and amplitude of which may be readily averred. These powerful sound impulses are well adapted for use in seismic exploration systems and also can be used to advantage for other purposes.

Seismic surveys which are conducted over water covered areas use various methods for generating seismic energy as by the detonating of conventional powder or dynamite, or gas mixtures, electrical discharge of sparks to ionize a portion of the water surrounding the electrode, or suddenly releasing a container of high pressure air underwater for generating a large seismic or pressure wave signal. These seismic signals are reflected from subsurface geological formations and structures and are received by seismometers and recorded.

In most methods utilized, it is customary to either position one or more detectors on the ground surface or tow them through the water in the vicinity of the sound source to detect the signals that are reflected from the various subsurface formations and structures. The detected signals are recorded on suitable equipment contained on the towing vessels, either in the form of analog or digital signals. Also, at times the signals are recorded as variable area signals to provide a profile of the surveyed area. The latter recording is similar to those contained with conventional depth-sounding equipment.

All of the above seismic methods and devices have various disadvantages and thus none is completely suitable for use in all circumstances. The handling of an explosive material is, of course, dangerous as mentioned previously wherein the explosions themselves tend to kill much marine life, an example being disclosed in U. S. Pat. No. 2,877,859. Also, in the case of dynamite two separate vessels are required; one for handling the dynamite and the other for the recording equipment. This, of course, increases the cost of the survey.

Aside from the operational advantages over conventional dynamite surveys, the disclosed system affords better data acquisition through the effective attenuation of the signals' secondary oscillations.

The use of explosive gas mixture solves some of the problems that arise with dynamite, since explosive gas mixtures do not kill as much marine life, a further example being disclosed in U. S. Pat. No. 3,620,327. Normally, gas mixtures can be stored as separate, nonexplosive gases on the same vessel that contains the recording equipment. Thus, the need for an additional vessel or the possibility of killing marine life is reduced. While one disadvantage of gas type sound sources is the relatively short life of the flexible container or sleeve in which the explosive gas mixtures are detonated, conservation of the present environment is one of the principal problems.

In sound sources employing an electrical discharge, it has been customary to discharge a bank of capacitors charged to a high voltage through a single electrode or multiple parallel electrodes and a ground plate. When the capacitor bank is discharged into the water by the electrodes and ground plate the pressure bubble is produced at each electrode tip, for the ground plate serves as a return for the electrical energy. The pressure bubble produces the desired seismic impulse while the ground adds nothing to the magnitude of the outgoing acoustical wave. In fact, only 3 – 5 percent of the total electrical energy available in the capacitor bank is converted to useful acoustical energy in the water. Further, many spark electrodes in parallel may be used simultaneously as disclosed in U. S. Pat. No. 3,613,823.

Well known methods to attenuate the pulsation of energy bubbles consist in using a metallic sphere which is provided with a plurality of holes regularly distributed on its wall and in which the explosion is carried out, this sphere is made of a material which can withstand the explosion, as disclosed in U. S. Pat. Nos. 2,877,859 and 3,525,416. While, however, it is difficult to build such spheres having a sufficient mechanical strength to withstand numerous repeated explosions, complete attenuation of bubble pulse amplitude is still lacking. Another known device comprises a container with a resilient opening and closing element which provides an intermittent connection of the interior of the container with the surrounding liquid medium, as disclosed in U. S. Pat. No. 3,444,953. Another pneumatic sound source comprises two chambers around a single integral piston valve as disclosed in U. S. Pat. No. 3,276,534, but this mechanism cannot be increased in volume without changing the pulse signature or the bubble ratio. None of the above systems can increase their energy output, without changing their signatures and bubble ratios, much less can they completely attenuate the amplitude of bubble pulsation or oscillations.

OBJECTS OF THE INVENTION

Accordingly, a primary object of this invention is to provide at least one method for increasing the energy output of a seismic pneumatic energy generator, the total volume of the compressed air chambers, and the total exhaust port area without requiring a change in the shape of the exhaust ports and without changing the pulse signature nor the bubble ratio.

Another primary object of this invention is to provide several mechanisms for carrying out the method for increasing the energy output of a seismic pneumatic energy generator.

A further object of this invention is to provide a mechanism for shaping the desired seismic signal by elongating the shape of the air chamber and exhausting the air radially from different positions on the chamber to attenuate secondary pulses.

Another object of this invention is to attenuate the associated seismic bubble pulses and their detrimental effect to seismic exploration.

A still further object of this invention is to provide a seismic pneumatic energy pulse generator with widely dispersed radiating exhaust jets for shaping the primary pulse so that its dominate frequency will be lowered for placing more of the energy into the useful seismic frequency range which results in greater penetration of the seismic signal within the sedimentary section.

Another object of this invention is to provide a seismic pneumatic energy pulse generator which is easy to operate, is of simple configuration, is economical to build and assemble, and is of greater efficiency for generating a primary pulse for greater penetration of the seismic signal within the sedimentary section.

Other objects and various advantages of the disclosed method and seismic pneumatic energy pulse generators for attenuation of secondary pulses in offshore subsurface exploration will be apparent from the following detailed description, together with accompanying drawings, submitted for purposes of illustration only and not intended to define the scope of the invention, reference being had for that purpose to the subjoined claims.

BRIEF DESCRIPTION OF THE DRAWINGS

The drawings diagrammatically illustrate by way of example, not by way of limitation, three forms or mechanisms for carrying out the method of the invention wherein like reference numerals have been employed to indicate similar parts in the several views in which.

DESCRIPTION OF THE INVENTION

Figure 1:
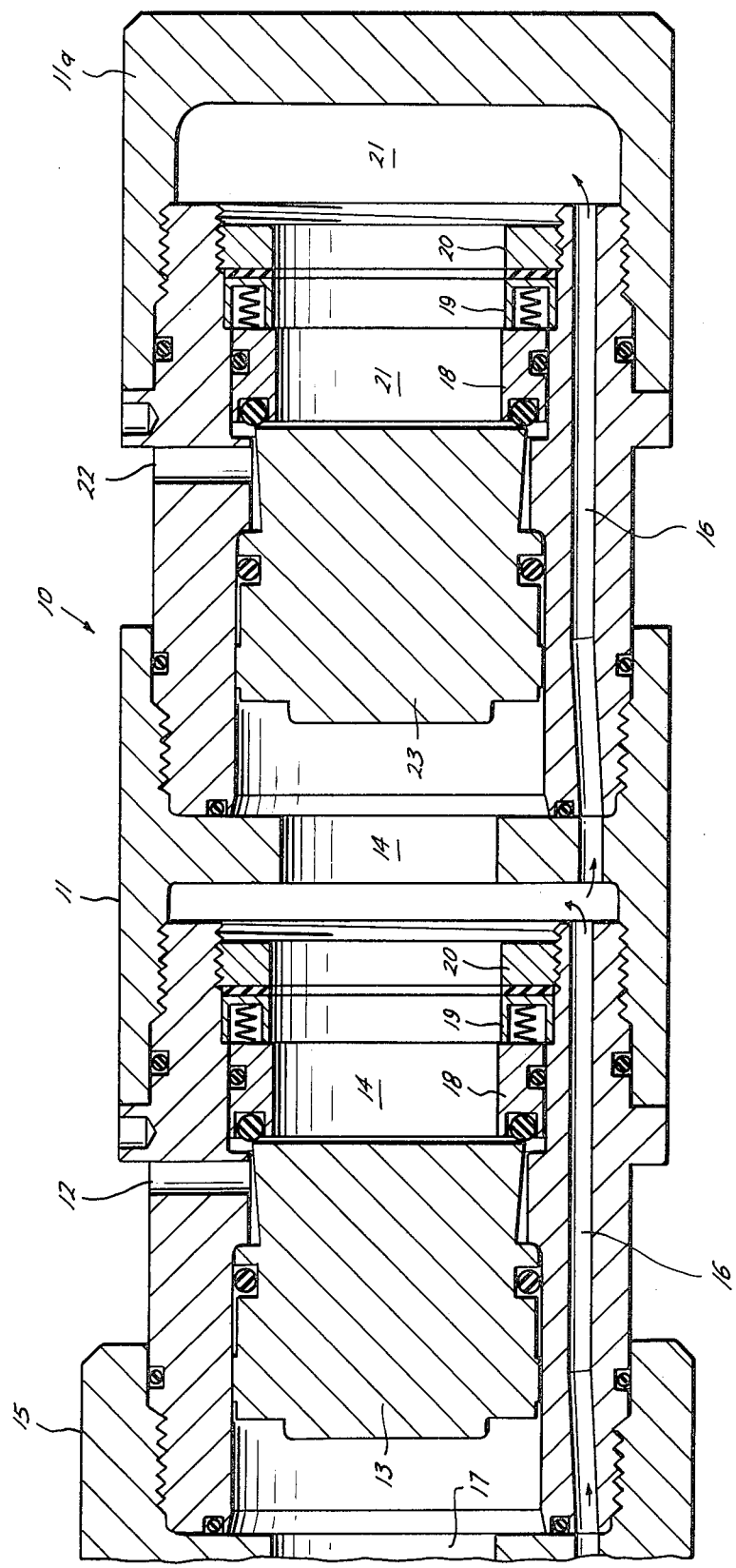
FIG. 1 is a schematic sectional view of one embodiment of the new seismic pneumatic energy pulse generator for attenuating secondary pulses.

The invention disclosed herein, the scope of which being defined in the appended claims, is not limited in its application to the details of construction and arrangements of parts shown and described for carrying out the disclosed method, since the invention is capable of other embodiments for carrying out other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

The shape of the primary seismic pulse generated by the discharge of an explosive device, such as but not limited to, an air gun under water is determined primarily by the size of the air gun's port and throat areas, the rate of discharge of the air or gas into the surrounding water, the gas pressure and the reservoir chamber, and the volume of air discharged into the water. If a particular design of air gun is operated at the same air pressure and chamber volume of gas, it can be predicted that the generated primary pulse shape will be repeatable. Changing the charging pressure of the air chamber, other than altering the amplitude of the primary pulse will not have any significant effect on the time duration of the primary pulse.

When it is desired to increase the output energy from a seismic pneumatic energy pulse generator or an air gun of a good design having a good pressure pulse signature and a good bubble ratio, the usual solution is to increase the size of all parts proportionally. This results in all new design, trial and error testing, and complete retooling, etc. The present invention preserves the original good signature, the good bubble ratio, and the shape of the exhaust ports, cylinders, and valves.

A good and desired pulse signature is a sharp pointed curve on a pressure amplitude versus time graph having a single high point relative to a curve comprising several equal height points for detection and measurement after reflection and refraction through the earth.

The most desired bubble ratio likewise is a curve with a single high peak and relatively low secondary peaks on a pressure amplitude versus time graph due to the contracting and expanding action of the bubble resulting fron an under water discharging air gun.

DESCRIPTION OF THE METHODS

This invention comprises a few new methods for increasing the energy output of a seismic pneumatic energy generator having a compressed air chamber in an elongated housing with exhaust ports and a valve therefor, for generating a seismic primary pulse with attenuated secondary pulses.

Basically, the method comprises the steps of, 1. forming a second compressed air chamber with exhaust ports and valve in the elongated housing similar to and in tandem relationship behind the first compressed air chamber, and 2. depressurizing the second compressed air chamber responsive to depressurizing of the first compressed air chamber for releasing energy from both air chambers without changing the pulse signature nor the bubble ratio.

The second method step may be broken down into the steps:

1. depressurizing the first compressed air chamber responsive to a forward movement of the first valve, 2. moving the second valve forwardly responsive to depressurizing of the first chamber, and 3. depressurizing the second chamber responsive to the forward movement of the second valve.

A modified method for increasing the energy output, the total compressed air chamber volume, and the total exhaust port area of a seismic pneumatic energy generator without requiring change in the shape of the exhaust ports and without changing the pulse signature nor the bubble ratio comprises adding the following steps to the above basic method:

1. forming a third similar compressed air chamber with exhaust ports and valve in tandem relationship behind the second chamber, and 2. depressurizing the third chamber responsive to depressurizing of the second chamber for releasing energy from all three compressed air chambers.

A further modified method for increasing energy output comprises the additional steps to the basic method of, 1. forming a plurality of similar compressed air chambers in tandem relationship behind the second air chamber, each chamber having exhaust ports and valve, and 2. depressurizing each of the chambers responsive to depressurizing of the chamber ahead for releasing energy from all compressed air chambers.

DESCRIPTION OF THE SEISMIC PNEUMATIC ENERGY PULSE GENERATORS

The drawings disclose three embodiments of the invention for carrying out or practicing the above described methods for increasing the energy output, the total volume of the compressed air chambers, and the total exhaust port area of a seismic pneumatic energy generator without requiring change in the shape of the exhaust ports and without changing the pulse signature nor the bubble ratio. The three energy generators or air guns are disclosed in the respective FIGS. 1, 2, and 3.

While the disclosed pulse generator is designed primarily for being lowered into a shot hole between 50 and 250 feet for a seismic firing, it also may be utilized for towing under water for offshore subsurface exploration. Any suitable high pressure gas may be utilized, such as but not limited to, air.

The basic seismic pneumatic energy pulse generator or air gun 10, FIG. 1, comprises primarily an elongated cylindrical housing 11 including a first high pressure air chamber 14, a set of exhaust ports 12 radiating outwardly from the longitudinal center line of the cylindrical housing, a piston valve 13 slideably mounted in the compressed air cylindrical chamber 14 for closing and opening the exhaust ports 12, a conventional high pressure firing device trigger means or valve restraining means 15, to close the exhaust ports 12 and high pressure supply line 16. This basic portion or air gun is conventional and disclosed in greater detail in Assignee's co-pending patent application Ser. No. 232,148 filed Mar. 6, 1972 by J. J. Havlik, B. H. Towell, and K. D. Shaub. While one or more exhaust ports 12 may be utilized, a few radially wide and axially thin exhaust ports are preferable, as illustrated in greater detail in Assignee's co-pending patent application Ser. No. 160,693, filed July 8, 1971, by J. J. Havlik and B. H. Towell, now U.S. Pat. No. 3,750,097, issued July 31, 1973.

The conventional firing device 15 as disclosed in the immediately above identified patent application comprises a small chamber 17 charged with high pressure air from supply line 16 for restraining piston valve 13 rearwardly (to the right in FIG. 1) overcoming the forward force of the charged chamber 14 due to the differential area of the valve front face over the back face. The firing device 15 operates by depressurizing its small chamber 17 suddenly to accordingly cause the valve 13 to suddenly move forward to vent chamber 14 to exhaust ports 12. Conventional sealing rings 18, 19, and 20 and "O-Rings" are used throughout for purposes of making air-tight and water-tight seals.

FIG. 1 further shows the complete combination of elements making up the new seismic pneumatic energy pulse generator, which combination with the above elements comprises a second compressed air chamber 21 similar to the forward air chamber 14 supplied by the same high pressure air line 16, exhaust ports 22 identical to the forward exhaust ports 12, and piston valve 23 identical to forward piston valve 13 for closing and opening exhaust ports 22. Likewise due to the larger frontal area on the front face of valve 23, FIG. 1, relative to rearward area of the rear face of valve 23, when air pressure fills chamber 14 first, it restrains rear piston valve 23 in its fully rearward position against the smaller force of charged chamber 21. The high pressure air flow in supply line 16 reaches its rearward end last and pressurized chamber 21 last, the end wall 11a forming the end of the housing likewise.

Sealing rings 24, 25, and 26 and the various "O-Rings" provide air-tight and water-tight seals throughout the air gun.

Rear wall 11a of housing 11 forms the rear end of chamber 21.

OPERATION OF AIR GUN OF FIG. 1

The high pressure air flowing through supply line 16 from an adequate source forward first charges up firing device 15 wherein the force of charged chamber 17 forces the forward valve 13 rearwardly, particularly due to its larger forward face area. As high pressure air continues to flow rearwardly, first or forward chamber 14 is pressurized, it forcing the second valve rearwardly. With the high pressure air arriving at the end of its supply line, rearward chamber 21 is charged last.

Then upon actuation of the firing device 15, its charged chamber 17 is suddenly exhausted and depressurized permitting forward piston valve 13 to be pushed forwardly to vent forward chamber 14 from exhaust ports 12. Thus, depressurization of forward compressed gas chamber 14 permits rearward piston valve 23 to rapidly slide forward to uncover rearward exhaust ports 22 to instantly release the compressed air from the latter chamber. Thus, by utilizing a second compressed air chamber, exhaust ports, and piston valves practically identical to the forward or first compressed air chamber with its exhaust ports and piston valve, the total volume of compressed air chambers is increased, the total exhaust port area is increased, and accordingly the total energy output is increased from the basic air gun without requiring change in the shape of the exhaust ports and thus no change is required in the original good pulse signature nor is any change required in the original good bubble ratio.

The size of the forward compressed air chambers may be varied to adjust the lag time between the opening of exhaust ports 12 and 22.

DESCRIPTION OF AIR GUN OF FIG. 2

Figure 2:
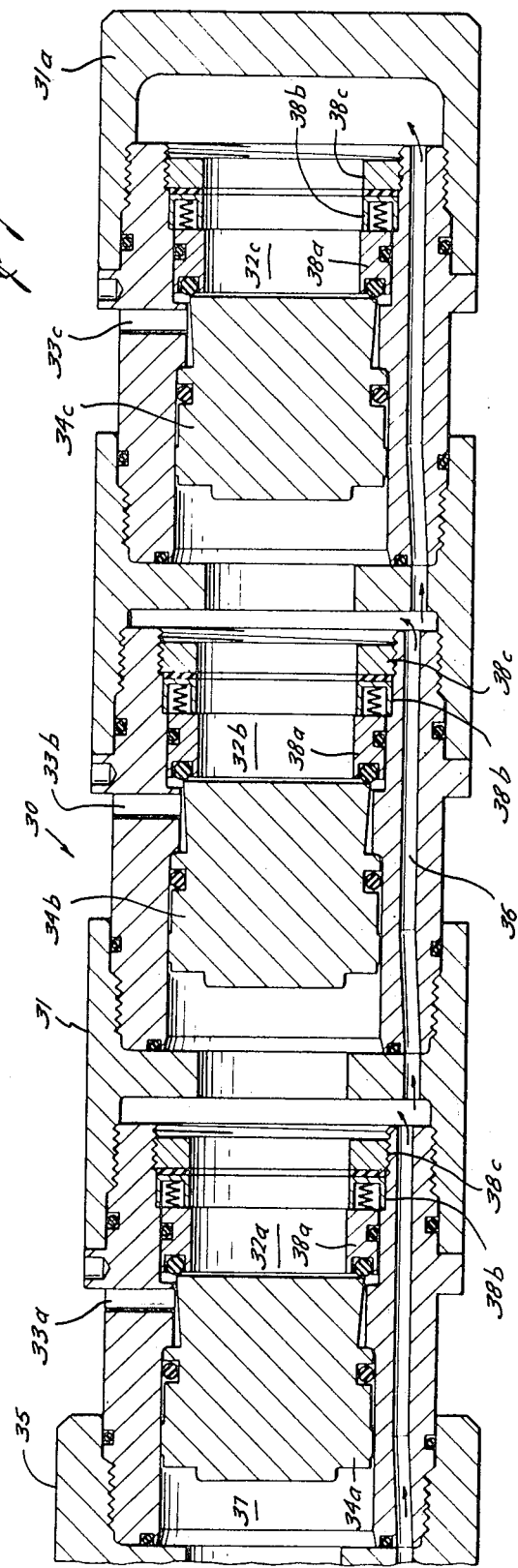
FIG. 2 is a schematic sectional view of a modification of FIG. 1.

FIG. 2 discloses an air gun or seismic pneumatic energy pulse generator 30 comprising an elongated cylindrical housing 31 having three compressed air chambers 32a, 32b, and 32c, the chambers having exhaust ports 33a, 33b, and 33c, respectively, which are closed by piston valves 34a, 34b, and 34c, respectively. Firing device 35 having small air chamber 37 is similar to firing device 15 of FIG. 1. Air supply line 36 feeds high pressure air to the four chambers 37, 32a, 32b, and 32c successively. Sealing rings 38a, 38b, and 38c and the various "O-Rings" illustrated provide adequate fluid-tight and air-tight seals in the air gun housing. Rear wall 31a of housing 31 closes the rear end of chamber 32c.

OPERATION OF AIR GUN OF FIG. 2

Compressed air from supply line 36 flows first to small chamber 37 of the firing device 35 to force and maintain piston valve 34a in its fartherest, most rearward position for closing the radial exhaust ports 33a. Simultaneously high pressure air flows further to begin filling the first energy releasing chamber 32a and which high pressure urges the next piston valve 34b rearwardly to close its exhaust ports 33b. Later as high pressure air reaches the second large chamber 32b, it is charged and rearward piston valve 34c forced into its most rearward position to close its exhaust port 33c. High pressure air finally charges up most rearward chamber 32c.

Upon sudden release of pressure in the firing device small chamber 37, the first and foremost piston valve 34a suddenly moves forwardly to open its exhaust ports 33a to exhaust the high pressure air from first and forward chamber 32a. As compressed air chamber 32a begins to exhaust and depressurize, second piston 34b moves forwardly to open its exhaust ports 33b to begin exhausting of chamber 32b which causes rearward piston valve 34c to move forwardly to cause energy release from the rearward chamber 32c without enlarging the diameter of the air gun or changing the size of the exhaust ports, and without changing the signature or bubble ratio of the original air gun. With high pressure air flowing continually, the gun is recharged for its next firing. To vary the time lag between the opening of the three exhaust ports 33a, 33b, and 33c, the size of the two chambers 32a and 32b may be varied. Fifty percent more total energy is obtained from this modification over the first.

DESCRIPTION OF AIR GUN OF FIG. 3

Figure 3:
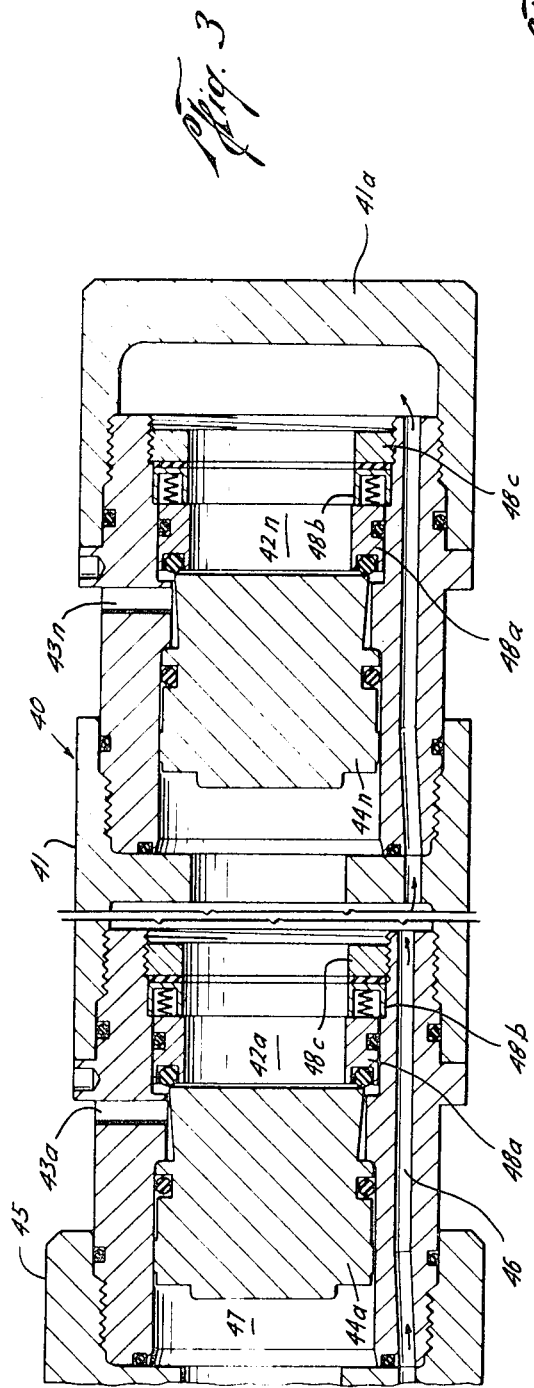
FIG. 3 is a schematic sectional view of another modification of FIG. 1.

FIG. 3 illustrates an air gun or seismic pneumatic energy pulse generator 40 including an elongated cylindrical housing 41 having a first or forward compressed air chamber 42a having exhaust ports 43a operated by piston valves 44a actuated initially by firing mechanism 45 with small air chamber 47 similar to that of FIG. 1. Air supply line 46 supplies high pressure air to the chambers successively. The embodiment of FIG. 3 has as many high pressure air chambers as a particular design calls for to provide the required energy output. The last or rearward compressed air chamber 42n has radial exhaust ports 43n controlled by piston valve 44n. Suitable sealing rings 48a, 48b, and 48c and the various O-Rings are provided for ensuring an air-tight and liquid-tight seal in the housing 41 of the air gun. A rear housing wall 41a forms the end of the chamber 42n.

OPERATION OF AIR GUN OF FIG. 3

Compressed air is supplied first from compressed air supply line 46 to the firing mechanism 45 and its small chamber 47 as it is at the beginning of the rearwardly extending line. After charging chamber 47, it charges compressed air chamber 42a and each successive chamber to the last chamber 42n, each piston valve from valve 44a to 44n being actuated and held in its most rear position. Upon firing of the firing mechanism 45 by suddenly releasing the pressure in small firing device chamber 47, piston valve 44a moves forwardly to begin forward movement of each successive piston valve until the last piston valve 44n is actuated forwardly to open the last exhaust ports to release the high pressure air from chamber 42n.

This seismic pneumatic energy pulse generator likewise may have its time lag varied by varying the volume of the cylinders therein.

Accordingly, it will be seen that the disclosed methods and seismic pneumatic energy pulse generators of increased energy output of increased total volume of compressed air chambers, and of increased total exhaust port areas without requiring change of shape of the exhaust ports, without changing the pulse signature, and without changing the bubble ratio operate in a manner which meets each of the objects set forth hereinbefore.

While several methods of the invention and three mechanisms for carrying out the methods have been disclosed, it will be evident that various other methods and modifications are possible in the arrangement and construction of the disclosed methods and seismic pneumatic energy pulse generators for attenuation of secondary pulses without departing from the scope of the invention and it is accordingly desired to comprehend within the purview of this invention such modifications as may be considered to fall within the scope of the appended claims.

We claim:

1. A method for forming an elongated air bubble for increasing the energy output of a seismic pneumatic energy generator having a first compressed gas chamber in an elongated housing with a first exhaust port radiating from the compressed gas chamber and with a first valve and a second compressed gas chamber with a second exhaust port and a second valve in the elongated housing movable independently of said first valve in tandem relationship behind the first compressed gas chamber comprising the steps of,
   a. moving the first valve for depressurizing and releasing the energy from the first compressed gas chamber, and
   b. moving the second valve after movement of the first valve depressurizing the second compressed gas chamber for releasing energy from both compressed gas chambers in close succession without changing the pulse signature nor the bubble ratio.

2. A method as recited in claim 1 comprising the additional steps of,
   a. forming a third similar compressed gas chamber with a third exhaust port and a third valve in the elongated housing similar to the first compressed gas chamber in tandem relationship behind the second compressed gas chamber, and
   b. moving the third valve after movement of the second valve for depressurizing the third compressed gas chamber for releasing energy from all three compressed gas chambers in close succession without changing the pulse signature nor the bubble ratio.

3. A method as recited in claim 1 comprising the additional steps of,
   a. forming a plurality of compressed gas chambers in the elongated housing similar to the first and preceding compressed gas chamber in tandem relationship behind the second and preceding compressed gas chamber, each chamber having its own exhaust port and an independent valve, and
   b. moving each valve only after the preceding valve has been moved for depressurizing each of the compressed gas chambers for releasing energy from all compressed gas chambers in close succession without changing the pulse signature nor the bubble ratio.

4. A seismic pneumatic energy generator for forming an elongated air bubble comprising,
   a. a first compressed gas chamber in an elongated housing,
   b. a plurality of first exhaust ports radiating from said compressed gas chamber having a first port area and pulse signature,
   c. a first valve operable in said compressed gas chamber for opening said exhaust ports,
   d. a second compressed gas chamber in the elongated housing in tandem relationship with said first compressed gas chamber,
   e. a plurality of second exhaust ports radiating from said compressed gas chamber having a port area equal to said first port area,
   f. a second valve operable on said second compressed gas chamber after and independently of said first valve, and
   g. said second valve comprising means for opening said second exhaust ports after the opening of said first exhaust ports for forming a seismic pneumatic energy generator of increased energy output for forming an elongated bubble without changing the pulse signature.

5. A seismic pneumatic energy generator as recited in claim 4 wherein,
   a. said first valve is a piston valve slideable over said first exhaust ports in said first compressed gas chamber.

6. A seismic pneumatic energy generator as recited in claim 4 wherein,
   a. said second valve is a piston valve slideable over said second exhaust ports in said second compressed gas chamber.

7. A seismic pneumatic energy generator as recited in claim 4 wherein,
   a. said first valve is a piston valve slideable over said first exhaust ports in said first compressed gas chamber, and
   b. said second valve is a piston valve slideable over said second exhaust ports in said second compressed gas chamber.

8. A seismic pneumatic energy generator as recited in claim 7 wherein,
   a. said first piston valve forms the forward end of said first compressed gas chamber in said elongated housing, and
   b. said second piston valve forms the rearward end of said first compressed gas chamber.

9. A seismic pneumatic energy generator as recited in claim 7 wherein,
   a. said second piston valve forms the forward end of said second compressed gas chamber, and
   b. an end wall of said elongated housing forming the rearward end of said second compressed gas chamber.

10. A seismic pneumatic energy generator as recited in claim 7 wherein,
    a. said first piston valve forms the forward end of said first compressed gas chamber in said elongated housing, and
    b. said second piston valve forms the rearward end of said first compressed gas chamber,
    c. said second piston valve forms the forward end of said second compressed gas chamber,
    d. an end wall of said elongated housing forming the rearward end of said second compressed gas chamber, and
    e. first valve release means comprising a compressed gas chamber for restraining forward and exhaust port opening movement of said first slideable valve exerted by said first compressed gas chamber.

11. A seismic pneumatic energy generator as recited in claim 10 wherein,
    a. second valve release means comprising said first compressed gas chamber for restraining forward and exhaust port opening movement of said second sideable valve exerted by said second compressed gas chamber.

12. A seismic pneumatic energy generator for forming an elongated air bubble comprising,
    a. a first compressed gas chamber means in an elongated housing,
    b. first exhaust port means for said first compressed gas chamber means having a first port area and pulse signature,
    c. first valve means for said first exhaust port means for opening said first exhaust port means for depressurizing and releasing the energy from said first compressed gas chamber means, d. second compressed gas chamber means in said elongated housing in tandem relationship behind said first compressed gas chamber means, e. second exhaust port means for said second compressed gas chamber means having a port area substantially equal to said first port area, f. second valve means for said second exhaust port means, and g. said second valve means being movable on said second compressed gas chamber independently of said first valve means and after movement of said first valve means for opening and closing said second exhaust ports, and said second valve means being responsive to said depressurizing and movement of said first compressed gas chamber means for opening said second exhaust port means and releasing the energy from said second compressed gas chamber means for forming a seismic pneumatic energy generator of increased energy output without changing the pulse signature and bubble ratio.

13. A seismic pneumatic energy generator as recited in claim 12 wherein, a. said first compressed gas chamber means is substantially equal in volume to said second compressed gas chamber.

14. A seismic pneumatic energy generator as recited in claim 12 wherein, a. each of said first and second valve means is a piston valve sideable in its respective compressed gas chamber means.

15. A seismic pneumatic energy generator as recited in claim 12 wherein said elongated housing has, a. third compressed gas chamber means in tandem relationship behind said second compressed gas chamber means, b. third exhaust port means for said third compressed gas chamber means having a port area substantially equal to said first port area, c. third valve means for said third exhaust port means, and d. said third valve means being responsive to said depressurizing of said second compressed gas chamber means for opening said third exhaust port means and releasing the energy from said third compressed gas chamber means.

16. A seismic pneumatic energy generator as recited in claim 12 wherein said elongated housing has, a. a plurality of compressed gas chamber means in tandem relationship behind said second compressed gas chamber means, b. exhaust port means for each of said compressed gas chamber means, c. valve means for each of said exhaust port means, and d. each of said valve means being responsive to the depressurizing of the compressed gas chamber means immediately ahead thereof for opening its respective exhaust port means and releasing the energy from its respective compressed gas chamber means.

17. A seismic pneumatic energy generator as recited in claim 12 in which a delay between the release of energy from the first compressed gas chamber and the release of energy from the second compressed gas chamber varies with the delay between the openings of the first valve means and the second valve means, wherein further, a. the volume of said first compressed gas chamber means is varied for varying the delay between openings of said first valve means and said second valve means for varying the delay between the instant of release of energy from said first compressed gas chamber means and the instant of release of energy from said second compressed gas chamber means.

18. A seismic pneumatic energy generator as recited in claim 12 wherein, a. said gas utilized in said compressed gas chambers is air.

* * * * *